United States Patent
Chien et al.

(10) Patent No.: US 11,016,865 B2
(45) Date of Patent: May 25, 2021

(54) DATABASE-LEVEL AUTOMATIC STORAGE MANAGEMENT

(71) Applicant: Oracle International Corporation, Redwood Shores, CA (US)

(72) Inventors: Hanlin D. Chien, San Jose, CA (US); Prasad V. Bagal, Saratoga, CA (US); Harish Nandyala, Fremont, CA (US); Ana L. Solis, Guadalajara (MX); Santhosh Selvaraj, Fremon, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 179 days.

(21) Appl. No.: 15/295,983

(22) Filed: Oct. 17, 2016

(65) Prior Publication Data

US 2017/0109246 A1    Apr. 20, 2017

Related U.S. Application Data

(60) Provisional application No. 62/242,086, filed on Oct. 15, 2015.

(51) Int. Cl.
*G06F 16/13* (2019.01)
*G06F 16/16* (2019.01)
*G06F 16/182* (2019.01)
*G06F 16/27* (2019.01)
*G06F 16/21* (2019.01)
(Continued)

(52) U.S. Cl.
CPC ...... *G06F 11/2069* (2013.01); *G06F 11/2058* (2013.01); *G06F 16/13* (2019.01); *G06F 16/164* (2019.01); *G06F 16/182* (2019.01); *G06F 16/185* (2019.01); *G06F 16/21* (2019.01); *G06F 16/22* (2019.01); *G06F 16/2246* (2019.01); *G06F 16/27* (2019.01)

(58) Field of Classification Search
CPC ......... G06F 17/30091; G06F 17/30194; G06F 17/30283; G06F 17/30289; G06F 17/30312; G06F 16/21; G06F 16/27; G06F 16/182; G06F 16/22; G06F 16/164; G06F 16/13; G06F 16/185; G06F 16/2246
USPC ...................................................... 707/609
See application file for complete search history.

(56) References Cited

U.S. PATENT DOCUMENTS

| 5,403,639 A * | 4/1995 | Belsan ............... G06F 17/30067 |
| 2008/0005468 A1* | 1/2008 | Faibish ................. G06F 3/0622 711/114 |

(Continued)

OTHER PUBLICATIONS

Oracle® Automatic Storage Management, "Administrator's Guide", 12c Release 1 (12.1), dated May 2015, 620 pages.

*Primary Examiner* — Joshua Bullock
(74) *Attorney, Agent, or Firm* — Hickman Becker Bingham Ledesma LLP

(57) ABSTRACT

Techniques are describe herein for associating storage management properties with a group of files of a database referred to herein as a "file group". In this system, storage management properties are defined at the database-level. Thus, multiple databases can be stored across a single disk group, gaining the benefits of having multiple block access devices working in parallel, but each respective database may be associated with a respective file group in a one-to-one relationship, so that each database can have different storage management properties.

21 Claims, 7 Drawing Sheets

(51) Int. Cl.
    *G06F 16/22*     (2019.01)
    *G06F 16/185*     (2019.01)
    *G06F 11/20*     (2006.01)

(56) References Cited

U.S. PATENT DOCUMENTS

| | | | | |
|---|---|---|---|---|
| 2008/0256307 | A1* | 10/2008 | Fujimoto | G06F 1/3203 |
| | | | | 711/154 |
| 2008/0256427 | A1* | 10/2008 | He | G06F 11/1092 |
| | | | | 714/801 |
| 2009/0193006 | A1* | 7/2009 | Hermstadt | G06F 17/30315 |
| 2010/0146094 | A1* | 6/2010 | Elkayam | G06F 16/1837 |
| | | | | 709/223 |
| 2012/0278335 | A1* | 11/2012 | Bentkofsky | G06F 17/30327 |
| | | | | 707/743 |
| 2016/0170823 | A1* | 6/2016 | Miller | G06F 11/0772 |
| | | | | 714/56 |
| 2017/0024515 | A1* | 1/2017 | Ebberson | G06F 19/321 |

* cited by examiner

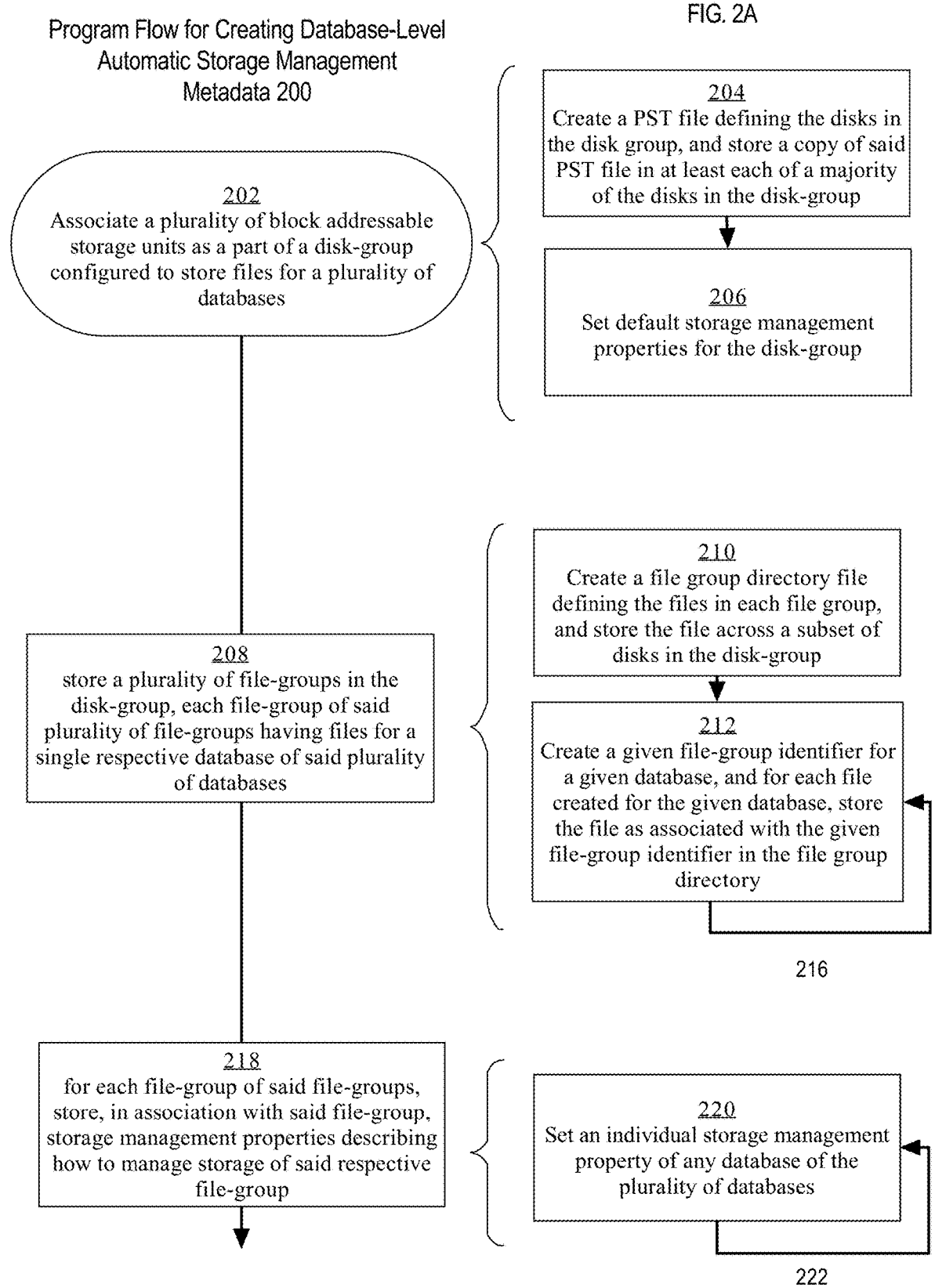

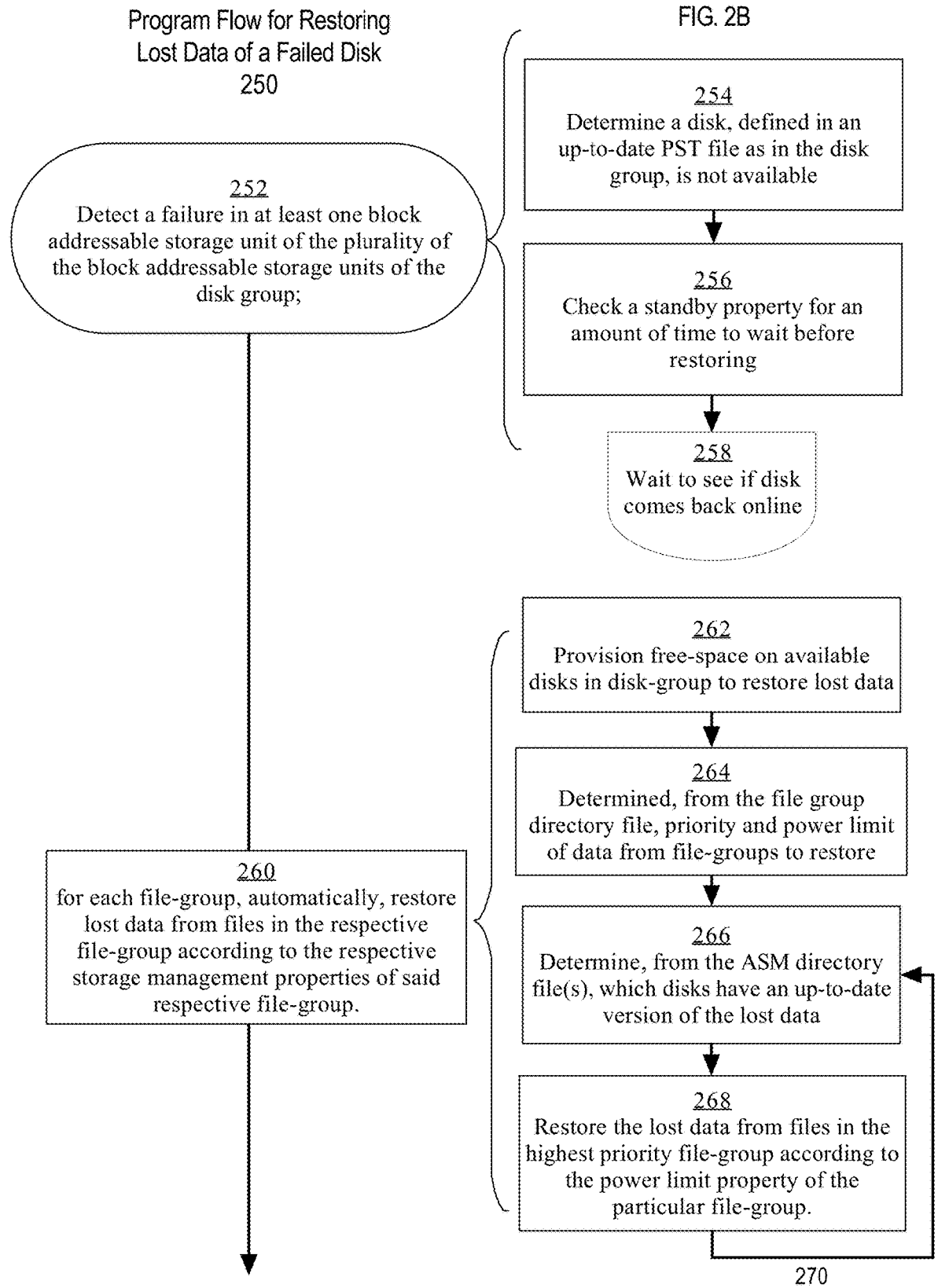

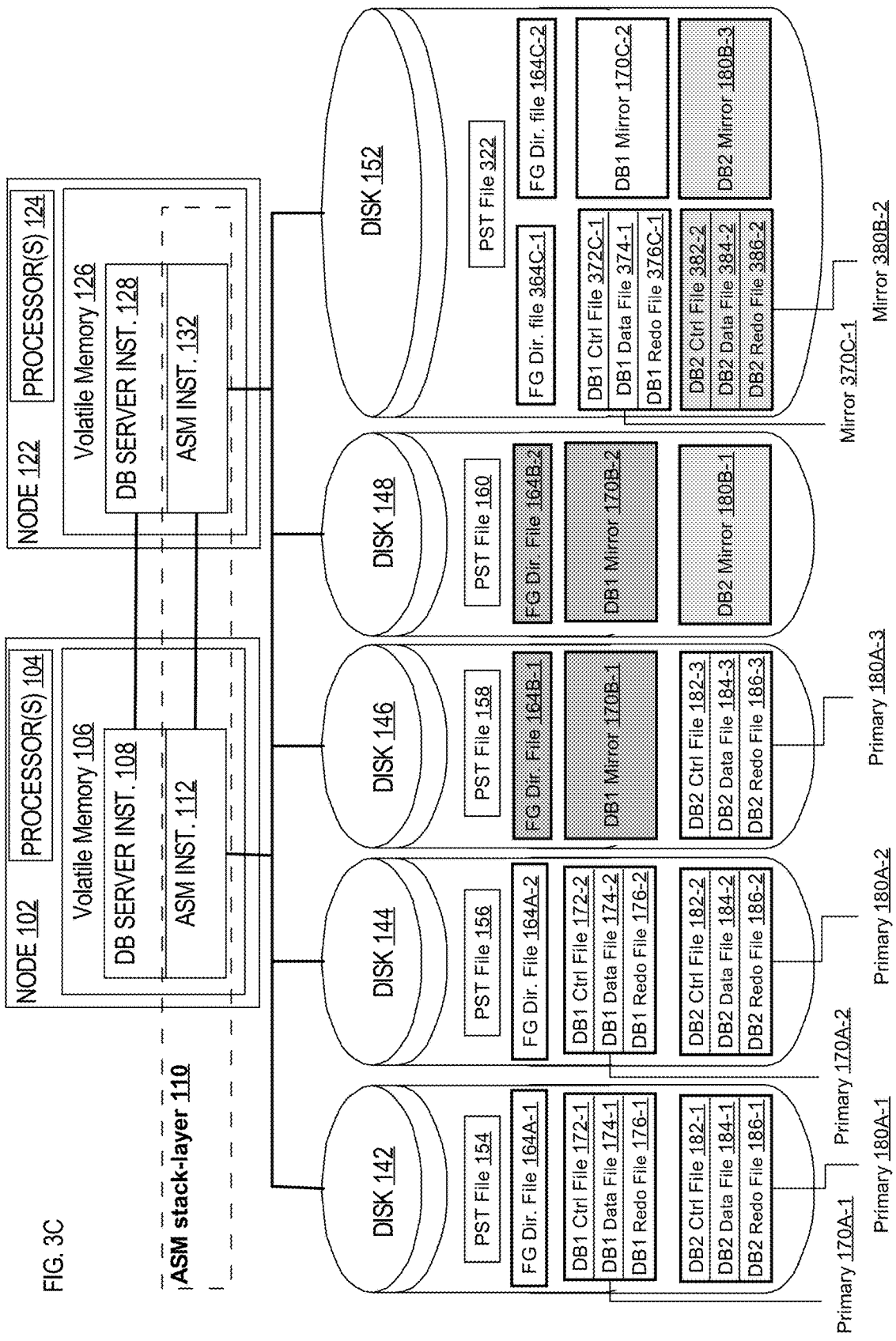

DATABASE-LEVEL AUTOMATIC STORAGE MANAGEMENT

BENEFIT CLAIM

This application claims the benefit of Provisional Appln. 62/242,086, filed Oct. 15, 2015, the entire contents of which is hereby incorporated by reference as if fully set forth herein, under 35 U.S.C. § 119(e).

FIELD OF THE INVENTION

The present invention relates to volume management, and more specifically to improved computer-implemented techniques for database-level automatic storage management.

BACKGROUND

A volume manager may be used to create a pool of storage known as a "disk group" composed of multiple "physical" block accessible devices to present and expose the multiple block devices as a higher I/O bandwidth and more fault tolerant logical volume. Typically, a volume manager lets you add disks or third party storage arrays to the logical volume on the fly. A filesystem is a logical abstraction that lets an application access a logical volume using file and directory names instead of block addresses.

Typically, storage is managed at the disk group level. If a database administrator (DBA) wants to maintain multiple databases with different capabilities and availability constraints, the DBA must allot disk groups for each set of availability constraints. A disk group is created for test databases; a second disk group is created for databases that need to be two-way mirrored, and a third disk group is made for databases that need to be three-way mirrored.

Unfortunately, when provisioning a disk group, a database administrator must decide what resources to assign to the different disk groups before knowing all of the requirements of the databases that may be stored on those disk groups. Over-provisioning a disk group to meet predicted future high availability constraints may result in wasted storage resources. Under-provisioning the disk group may result in having to later migrate another database away from an under-used disk, in order to add that disk to the under-provisioned disk group. Then the newly provisioned disk group needs to be rebalanced. Data movement is a slow and computationally expensive process, so it should be avoided whenever possible. Moving data may also hinder performance of other databases using the disk group.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2A is a flow chart illustrating an example program flow for creating database-level storage management metadata;

FIG. 2B is a flow chart illustrating an example program flow to automatically restore lost data of multiple databases after disk failure;

FIG. 3C is a block diagram illustrating an example of a system architecture of a storage management system after finalizing restoration of lost data;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for associating storage management properties with a group of files of a database referred to herein as a "file group". In this system, storage management properties are defined at the database-level. Thus, multiple databases can be stored across a single disk group, gaining the benefits of having multiple block access devices working in parallel, but each respective database may be associated with a respective file group in a one-to-one relationship, so that each database can have different storage management properties.

System Overview

Figure 1:
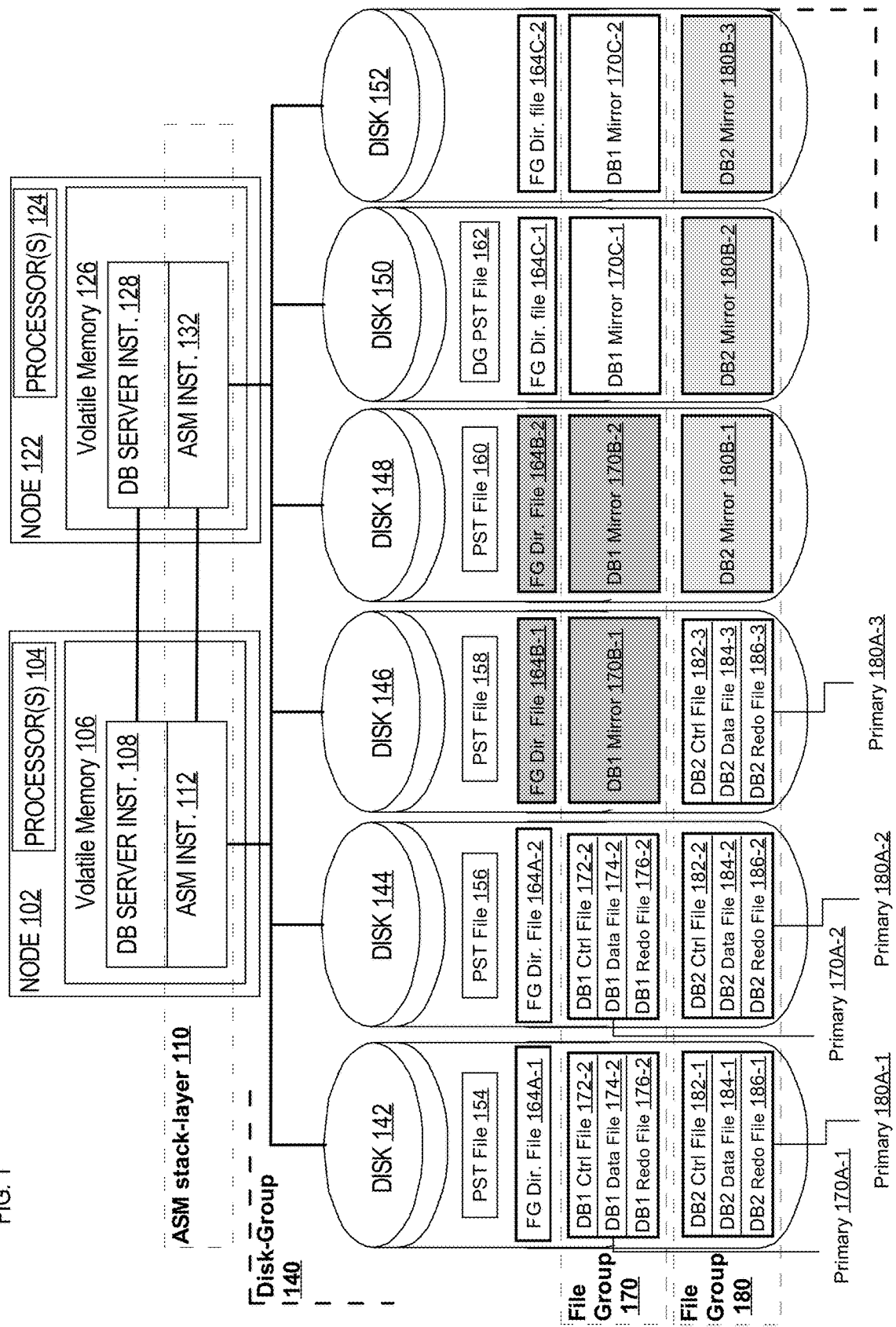
FIG. 1 is a block diagram illustrating an example of a system architecture of a storage management system configured for database-level automatic storage management.

FIG. 1 is a block diagram illustrating an example of a system architecture of a storage management system configured for database-level automatic storage management 100 comprising two database server computers ("nodes") 102, 122 coupled to addressable block storage units (referred to herein as "disks" for simplicity) 142, 144, 146, 148, 150, 152. The nodes 102, 122 comprise processors 104, 124 and volatile memory 106, 126 executing database server instances 108, 128 and automatic storage management (ASM) instances 112, 132. In alternative embodiments, the rDBMS 100 may comprise one or more database server computers each executing one or more database server instances coupled through an automatic storage management layer comprising one or more automatic storage management instances to one or more databases stored on one or more shared persistent storage devices (e.g., hard disks, flash memories). For example, while in the illustrated embodiment database server computer 102 is executing a single database server instance 108, in alternative embodiments a single database server computer may execute three database server instances, wherein each database server computer is operatively coupled to the same shared disk(s) through a single automatic storage management instance.

Database server instances 108, 128 execute database commands that are submitted to database server computer 102, 122 by one or more users or database applications. These users and database applications may be referred to herein as external entities to signify that they are external to the internal programs and structures of the rDBMS 100. An external entity may be connected to the rDBMS 100 through a network in a client-server relationship.

Each database server instance 108, 128 further comprises processes such as a query optimizer (not shown), a query coordinator (not shown), and one or more processes that execute database operations in parallel referred to as "slave processes" (not shown). A slave process may contain one or more threads, and could be referred to as a thread when the slave processes comprises a single thread. A thread, when reading data, could be referred to as a reader thread. A thread, when writing data, could be referred to as a writer thread.

Database management system (DBMS) 100 of FIG. 1 includes an automatic storage management (ASM) stack layer 110 comprising two automatic storage instances 112, 132. An ASM instance is a volume manager that automatically performs storage management operations between the block and file level. Reads and writes are routed through the ASM stack layer 110 to transparently provide automatic storage management between the database server instances 108, 128 and the persistent storage (e.g., disks 142-152). For example, a single read operation executed by database server instance 108 may be routed by ASM instance 112 to either a primary copy of data (e.g., 170A or 180A) or a mirror copy of data (e.g., 170B, 170C, or 180B) to provide high availability access to data at any given time. As another example, a single write operation executed by database server instance 108 may be cloned into additional writes in order to propagate the changes to both the primary copy of data (e.g., 170A or 180A) and the mirror copies of data (e.g., 170B and 170C, or 180B). The ASM layer 110 may be configured to require all writes to complete before executing the next database operation or the ASM layer 110 may be configured to asynchronously perform writes.

Disks 142-152 include data and metadata stored in files. The ASM stack layer 110 may store files in stripes. To stripe files, an ASM instance separates a file into equal sized stripes and spreads data evenly across a plurality of disks in a disk group (e.g., disk group 140). The stripes are a constant size and are shown in equally sized boxes in FIG. 1. A file contains many stripes, but only a few are shown for simplicity. In some cases, a file may be stored entirely on a single disk (e.g., file 154).

A database comprises tablespaces which are a collection of files used for storing data for database objects (e.g., tables, temporary tables, indexes, logs, and control files). Metadata regarding these database objects may be stored in the files themselves or in a separate file referred to as the data dictionary. Disks 142-152 may contain data from multiple databases, and thus, multiple different control files and data files belonging to different databases.

The automatic storage management layer 110 creates and stores files that are used by the automatic storage instances to manage the data in the databases. An ASM instance may read a PST file (e.g., 154) to determine which disk belongs to which disk group, a file group file (e.g., file 164) to determine the subset of files that belong to any file group. The file group file may also be used to determine which properties belong to a particular file group. An ASM instance may cache data from any ASM file in volatile memory local to the ASM instance that is using said data to decrease overhead required to perform storage management operations.

Performing an operation in database management system 100 typically involves calling multiple layers, with stack layers calling other stack layers. These calls can involve many stack layers in deeply nested and recursive traversals.

One example is a DML statement for the insertion of rows into a table. An SQL stack layer (e.g., a process in database server instance 108 or 128) may receive and analyze the SQL statement to formulate and carry out an execution plan, invoking a segment stack layer (e.g., another process in database server instance 108 or 128) to find free space for the rows in the specified table. The segment stack layer may match the specified table to the appropriate segment and invoke a tablespace stack layer to find a free extent with enough space for the rows. The tablespace stack layer may find or create the free extent in a data file created by the ASM stack layer. The call returns back to the segment stack layer, which may update the extent map for the segment. Then the call returns back to the SQL stack layer, which can now pass the free extent to a data stack layer (not shown) to insert the rows. The data stack layer formats the rows as row data and stores it in the free extent, updating any associated indexes or other row metadata as necessary.

Block Adressable Storage Unit

A byte is eight bits and is the minimum amount of data that may be addressed, retrieved from memory, or written to in byte-addressable memory. Thus, to manipulate a bit in a byte, a byte containing the bit must be fetched to register(s) by an instruction referencing the byte (or word containing the byte) and manipulated according to an instruction. In contrast, the minimum size for a unit of block-addressable memory is a block. A block comprises multiple bytes and multiple words. For block-addressable memory, a block is the minimum amount of data that may be addressed, retrieved from memory, or written to memory. Examples of block-addressable memory include flash memory and disk memory. To manipulate a bit or a byte in a block, a block containing those bits is loaded into a byte-addressable memory by an instruction referencing the block issued to a block-based interface, and then the bit or the byte is manipulated in the byte-addressable memory.

Disk Group

A disk group comprises a set of one or more block addressable storage units configured to store a plurality of database files for a plurality of databases. A block addressable storage unit may include a physical hard-disk, a logical unit, a third party storage array, or any type of SCSI device. The term "disk" as used herein is meant in the broad sense of any form of persistent storage device.

A disk group is self-describing—the metadata defining what addressable storage units are defined within the block addressable storage units of the disk group. The metadata defining a disk group is stored in one or more files called the partnership and status table (PST). The PST contains metadata about all block addressable storage units in a disk group—disk number, disk status, partner disk number, etc. Multiple copies of a PST must be available in case of disk failure. Thus, a complete PST file is located on single disk rather than striped across multiple disks.

In some embodiments, a copy of the PST file may not be located on every disk in a disk group. Instead, a copy of the PST file is located on a majority of disks in a disk group. For example, five copies of the PST file 154, 156, 158, 160, 162 are on five out of six disks 142-152 in disk group 140. If a disk storing a PST file fails, an ASM instance (e.g. ASM instance 112 or 132) may copy the PST file to another disk that previously did not contain the PST file. A disk group PST file may also be compared against another disk group PST file to determine if it is up-to-date. The PST files may contain a timestamp to determine which file is more current if two or more files are different.

For more information on disk groups and PST files please see the ASM specification Belden Eric, et. al. "Oracle® Automatic Storage Management, Administrator's Guide 12c Release 1 (12.1) E41058-11)" May 2015, the entire contents of which is hereby incorporated by reference as if fully set forth herein.

File Group

A file group describes a collection of files and one or more storage management properties associated with those files. For any particular storage management property, all of the files of a particular file-type in a file group must share the same value for that storage management property. Even though the files in a file group may share the same value for each particular storage management property, the files within a file group may be automatically managed differently based on their file-type. For example, all of the files of the same file-type in a file group share the same value for the redundancy property, but some files may be automatically mirrored an additional time based on their file type. The storage management properties of a file group can be set or changed at any time after a file group has been created.

A file group is contained inside a single disk group and is dedicated to a single database, multitenant container database (CDB), or pluggable database (PDB). For example, in FIG. 1, file group 170 is dedicated to database DB1 stored in example files 172, 174, and 176. File group 180 is dedicated to database DB2 stored in example files 182, 184, and 186.

A database (or CDB, or PDB) may only have one file group per disk group. A major benefit of file groups is being able to have different storage management properties for every database in the same disk group.

A file group directory file (e.g. file 164) contains metadata describing all existing file groups in a disk group including the list of files associated with each file group and the file group properties of each file group. A file group directory file is typically three-way mirrored automatically.

Files in a file group may be striped like any other file. A file group directory file (e.g., file 164) may store metadata regarding which files belong to which file group. The file group directory file may also store metadata regarding which storage management properties belong to which file groups. The metadata for a file designates which file group describes said file; conversely, the metadata for a file group lists the set of files that the file group describes. In other words, they are two pieces of metadata that point to each other.

Quota Group

In some embodiments, multiple file groups can be grouped into a quota group. A quota group may be used to define further storage management properties of a group of file groups. Certain properties, such as the maximum amount of storage that files in a group of file groups can occupy, can be set using a quota-group identifier. By setting the maximum amount of storage that files in a quota-group can occupy, a database administrator can ensure that there will be enough space to make mirrors copies of all the file groups in a disk group.

Redundancy

Redundancy is a storage management property of a file group that defines how many copies of a primary file must be stored as mirror copies. The primary and the mirror copies are typically stored on separate subsets of block addressable storage units called "fail-groups." Thus, if a disk in either a primary or mirror copy fails, an entire set of the required data and metadata will be available in the other failure group.

The accepted values of the redundancy property include: unprotected—meaning only the primary copy exists, mirror—meaning two total copies exist, high—meaning three total copies exists, parity—meaning that there is a parity extent for every N (configurable) data extents. The purpose of the parity extent is to be able to reconstruct the data from the loss of 1 data extent, and double—meaning that there are two parity extents for every N (configurable) data extents. With double parity, there is enough information to be able to restore the loss of 2 data extents.

In some embodiments, certain files or extents are mirrored three ways whenever possible. For example, file group files (e.g. file group file 164) are mirrored three ways whenever possible. In some embodiments, the $0^{th}$ extent of each databases first data file are mirrored three times even if the redundancy level is set to mirror (only two copies). The $0^{th}$ extent contains the file-header data block that contains a substantial amount of metadata regarding the file. If only the $0^{th}$ extent survives a catastrophic failure, this data can be used in conjunction with a tape backup to restore the database.

Mirror Split Copies

Mirror split copies are a storage management property of a file group that defines the number of extra copies that will be created for every data file in the file group, to be used for mirror split process. Mirror splits are used to supply the base image for sparse clones of a database. The number of extra copies for mirror split is independent of file redundancy, and will not respect failure group rules. That is, these copies will not necessarily be placed on separate failure groups. The extra copies can eventually be used as primary copy of the file when mirror split is executed for the file group. This property may be applied to only certain file-types, such as database data files. For example, if file group 170 is given the value "mirror" for the mirror split copy property, then DB1 data-file 174 may be mirrored on multiple disks within a failure group (e.g., DB1 data file 174-1 would have a copy on disk 142 and disk 144; DB1 data file 174-2 would have a copy on disk 144 and disk 142.)

Stripe Size

Striping is a storage management property of a file group that defines the size of a stripe for files in that file group. This property is important depending on the size of files in a particular database. A stripe is a contiguous block addressable space, so a larger stripe size means more contiguous reads from a single read head of a hardware disk. However, if the file sizes are small, then a larger stripe size will result in more wasted space. Striping may be fine-tuned with data block size in each particular database, so that each database has a stripe sized to maximize efficient reads and writes.

Software Versioning

Software versioning is a storage management property of a file group that defines the version of software that a database uses for backward compatibility purposes. If a database is down for maintenance, the software versioning property ensures that a disk group does not get upgraded to a later version of software that would potentially make that database unusable.

Restoration Properties

When a block addressable storage unit of a disk group fails, the data from that addressable storage unit needs to be restored and rebalanced across the remaining disks. Individual addressable storage units (e.g., a hard disk) can be sized to store a large amount of data (e.g., 10 TB). Moving that amount of data from an up-to-date copy to a new disk can take a lot of time and computing resources. A variety of properties can be set at the database level to ensure that high-priority databases are up and running with a full backup copy as soon as possible.

A. Priority

File groups with the highest priority are completely restored first, then file groups with the next highest priority, and so on. In some embodiments, this is even a finer grained process, where file-type is also taken into account. For example, a control file is necessary for a database instance to access a data-file in a particular database, so a control file is given priority of the data file. Similarly, a redo file is more important to the operation of a database than data file, so the files of the database redo files are restored prior to data files being restored.

B. Power Limit

Another property that can be fine-tuned for each database is the power limit. The power limit property is a storage management property that defines how many I/Os can be pending before the before an ASM instance (e.g., ASM instance 112 or 132) must wait before sending the next set of I/Os. This property is important because a database instance that is restoring a database may be competing for resources that are used during the normal execution of operations for another database. Setting the property to a high number of discrete I/Os will minimize the overhead for the restore operation, but end up reducing the performance of applications using another database. Thus, by keeping this number high for high priority databases, and low for low priority databases, the ASM layer operations in restoring and rebalancing a low priority database are less likely to interfere with the normal operations of a high priority database.

Implementation Overview

FIG. 2 is a flow diagram illustrating a program flow 200 for creating a database-level storage management metadata. At step 202, an ASM instance associates a plurality of block addressable storage units as part of a disk group. The disk group is configured to store files for a plurality of databases. As seen at step 204, associating a plurality of block addressable storage units may further include creating a PST file defining the disks in the disk group, and storing multiple copies of said PST file. As seen at step 206, associating a plurality of block addressable storage units may also further include setting default storage management properties for files within the disk group. The default storage management properties will apply if individual storage management properties are not set at the database-level.

At step 208, an ASM instance stores a plurality of file groups in the disk group. Each file group of the file groups may only have files corresponding to a single database. As seen at step 210, storing the file groups may further include creating a file group directory file defining the file groups, and striping those files across a subset of disks (referred to herein as a "failure group") of the disk group. The file group directory file is configured to describe the identity of a file group, its association with a database, all the property names and their values, and all the files that the file group describes. When the files for the file group are mirrored, the file group directory file will also be mirrored. As seen at step 212, storing the file groups may also further include creating a given file group identifier for a given database, and for each file created for the given database, storing the file as associated with the given file group identifier in the file group directory. Depending on the configuration, file groups can be created automatically or manually. Upon database creation, the storage management properties can be initially set to the default properties set at step 206.

Arrow 216 indicates that step 212 may need to execute multiple times. Each time a new database is created, a new file group and associated file group identifier are created in response. In some embodiments, the file group directory and properties file is created and maintained for all databases. In alternative embodiments, a new file group directory and properties file is created each time a new database is created.

At step 218, an ASM instance stores storage management properties for each file group. These properties act as metadata that a database administrator can set and an ASM instance can read to determine constraints when performing future storage management operations automatically. As seen at step 220, a database administrator can use a DDL statement to set any individual storage management property of any database in the disk group.

The arrow 222 indicates that this operation may be performed multiple times. A database administrator can set one or more storage management properties at database creation, prior to adding any data to a particular database. Then, the database administrator can later update the same property or update a different property for that database. Updating storage management properties may also be crucial after a change in the database management architecture, such as a disk failure or vertically or horizontally upgrading the storage resources the database management system architecture. For example, a default power limit may be set for if a disk fails, but after installing and adding a new disk to the disk group, a DBA may wish to increase the power limit over the weekend.

As another example, a database can have its redundancy property increased or decreased at any time. For example, the redundancy property for DB1 can be reduced from "high" to "mirror", in which case, the files would be rebalanced to look more like the DB2 files in FIG. 1. As an alternative example, the redundancy property for DB2 can be increased from "mirror" to "high", in which case, the files would be rebalanced to look more like the DB1 files in FIG. 1.

Maintaining DB(s) Based on Storage Management Metadata

Upon startup, the ASM instances 112, 132 read the PST files (e.g., PST files 154-162) to determine what addressable storage units (e.g., disks 142-152) are in a disk group (e.g., disk group 140). When a database server instance (e.g., database server instance 108) receives a selection of a database for use, a call is made to the corresponding ASM layer 110. The ASM layer then reads storage management metadata to determine which file group corresponds to the database. An ASM instance may cache data from any ASM file in volatile memory local to the ASM instance that is using said data to decrease the overhead required to perform future storage management operations. During database operations the ASM instance reads the file group directory file (e.g., file 164), as either cached data or from disk, to determine which file belongs to which file group and to determine which properties belong to each file group.

For example, assume database server instance 108 receives an application request to use a first database. This request gets parsed and passed to the corresponding ASM instance 112, which reads the file group directory file 164 to determine which files of that database are described by the file group 170. The properties of that file group to determine the storage management properties such as redundancy: high. When database server instance 108 receives an DML command that causes a write to be issued, the ASM instance 112 propagates the write to three different copies 170A, 170B, 170C of the database to meet the redundancy requirements.

As another example, assume database server instance 128 receives an application request to use a second database. This request gets parsed and passed to the corresponding ASM instance 132, which reads file group directory file 164 to determine which files of that database are described by the file group 170. The properties of that file group to determine the storage management properties such as redundancy: mirror. When database server instance 128 receives an DML command that causes a write to be issued, the ASM instance 132 propagates the write to two different copies 180A, 180B of the database to meet the redundancy requirements.

Restoration Overview

FIG. 2B is a flow diagram illustrating a program flow 250 of restoring lost data of a failed disk. At step 252, an ASM instance detects a failure in at least one block addressable storage unit of the disk group. As seen at step 254, detecting a failure may further include the ASM instance determining a disk, defined in an up-to-date PST file as in the disk group, is not available. In some embodiments, the ASM instance will check a standby property for an amount of time to wait before restoring as seen in step 256. After waiting a specified amount of time to see if the disk come back online at step 258, the ASM instance commences with the restore process. This wait time prevents the restoration process from initiating after each time a disk is temporarily offline.

At step 260, an ASM instance automatically restores lost data from files in each respective file group according to the respective storage management properties of each respective file group. As seen at step 262, restoring lost data may further include the ASM instance provisioning free-space on available disks in the disk group. As seen at step 264, restoring lost data may further include the ASM instance determining, from the file group directory file, priorities and power limits of the data from the file groups to be restored. Data from the highest priority level file group is restored first. Then the ASM instance determines, from the ASM directory file for that file group, which disks have an up-to-date version of the lost data. Finally, the ASM instance restores the lost data from files in the highest priority file group according to the power limit property of that particular file group. The arrow 270 indicates that steps 266 may be performed multiple times. Each time the process repeats, the ASM instance restores lost data from the next highest priority file group.

In some embodiments, the ASM instance may additionally prioritize data from files within a file group based on their file type. This involves determining the file type of the stripes of files that are to be restored, and restoring higher priority file-types before lower priority file-types.

Example of Restoration after Disk Failure

Figure 3A:
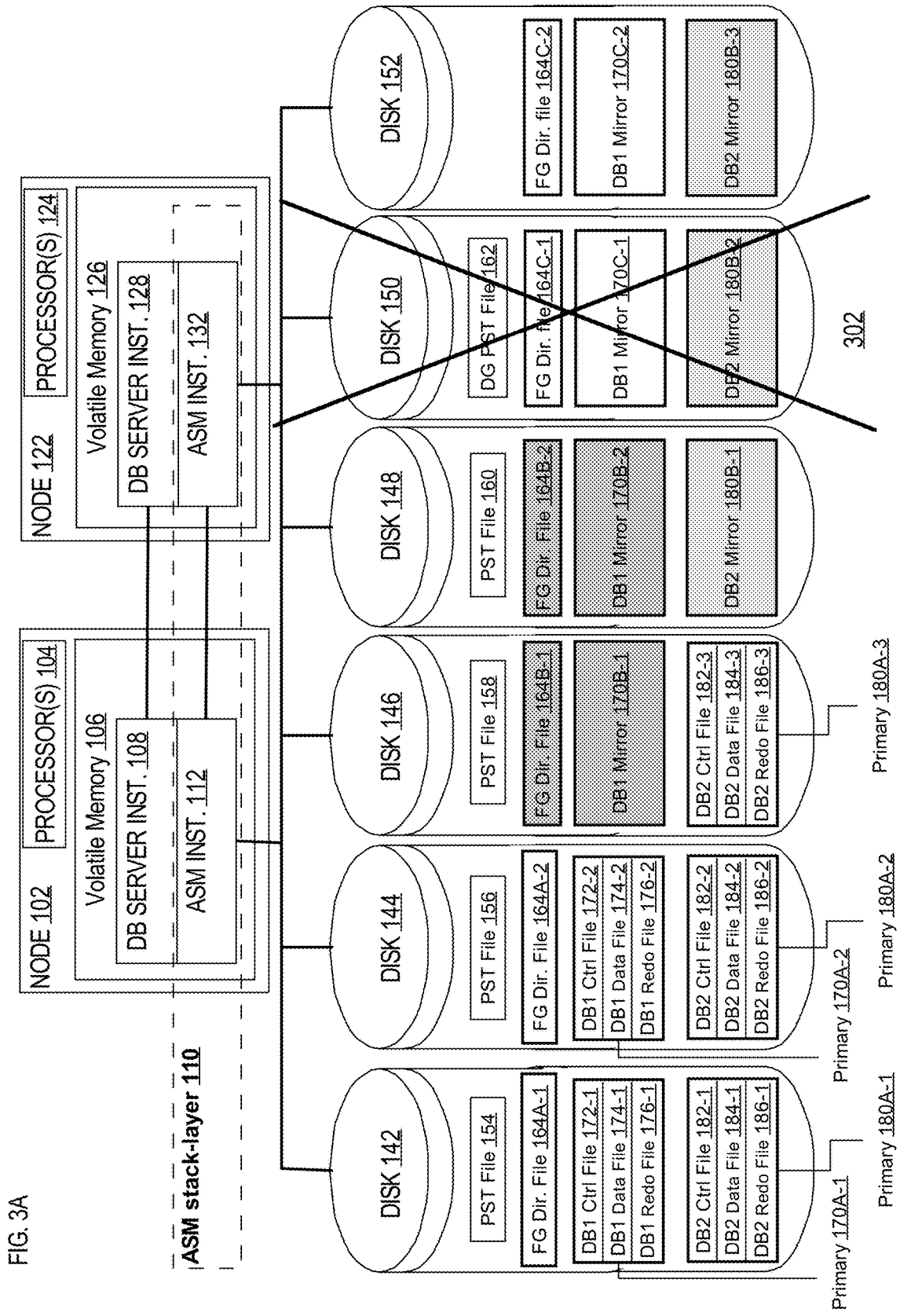
FIG. 3A is a block diagram illustrating an example of a system architecture of a storage management system after disk failure.

FIG. 3A is a block diagram illustrating system architecture of cluster 100 after a disk fails. The system architecture after disk failure 300 comprises loss of disk 150 and the PST file 162 of the disk group 140, the mirror 170C-1 of the first database and the mirror 180B-2 of the second database. After a disk fails, an ASM instance (e.g., ASM instance 112) scans the PST files 152, 156, 158, and 160 to determine which disk failed, whether the PST files are up-to-date. The ASM instance then scans a copy of the file directory (not shown) to determine which copies to mirror from when restoring the lost data and rebalancing. After reviewing the directory file (not shown), the ASM instance determines that mirror 170C-1 of the first database needs to be restored and mirror 180B-2 of the second database needs to be restored.

Figure 3B:
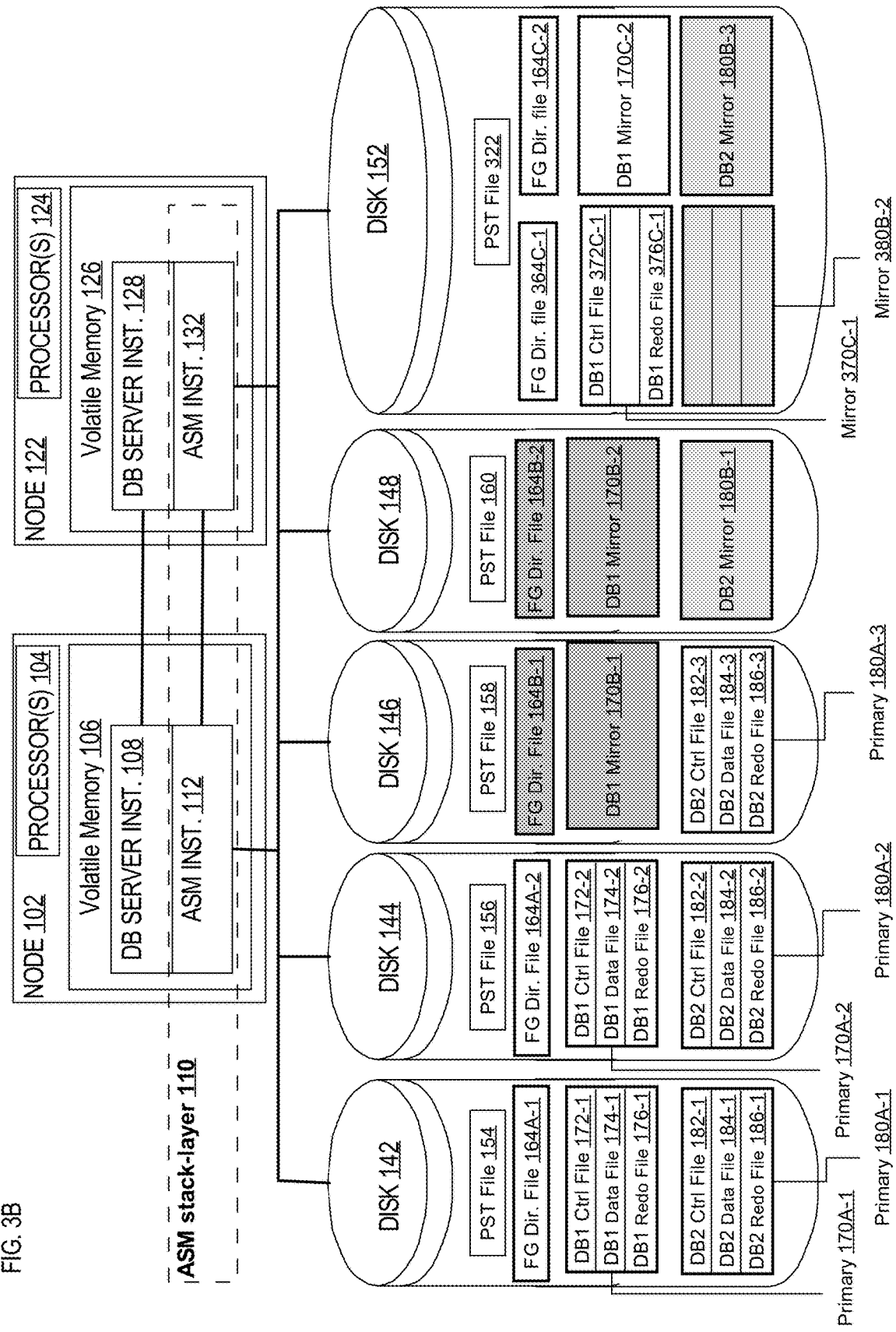
FIG. 3B is a block diagram illustrating an example of a system architecture of a storage management system after initiating lost data restoration.

FIG. 3B is a block diagram illustrating a system architecture of cluster 100 after restoration and re-balance has initiated. The system architecture after restoration and rebalance has initiated includes using extra space on disk 152 to rebuild the lost copies of data from disk 150.

The PST file 322 is rebuilt from PST file 154 of disk group 140 after determining, from the PST files, that file 154 is up-to-date;

The mirror 370C-1 of the first database is starting to be rebuilt from the primary copy 170A-1 after determining, from the file directory, that copy 170A-1 is up-to-date; and The mirror 380B-2 of the second database has not started to be rebuilt yet, but rebuilding will be from the primary copy 180A-2 after it is determined, from the file directory, that the primary copy 180A-2 is up-to-date.

In this example, the file group 170 has a priority property that ranks higher than the file group priority of file group 180. For example, File group 170 may have a priority property in the properties of file 164 ranked as "priority 1"; and File group 180 may have a priority property in properties of file 164 ranked as "priority 2".

The effect of the higher priority rank is that mirror 370C-1 of file group 170 is being completed prior to mirror 380B-2 of file group 180.

In this example, the file types have the following priorities:

a) ASM metadata
b) Control file and redo logs in high priority file group
c) Data files in high priority file group
d) Control file and redo logs in low priority file group
e) Data files in low priority file group Thus, in this example, the files completed in the following priority: file group directory file 364C-1>database control file 372C-1>database redo file 376-1. The database data file has not yet completed.

FIG. 3C is a block diagram illustrating a system architecture after restoration and re-balance has finalized. The system architecture after restoration and re-balance has finalized 340 includes the complete PST file 322 of disk group 140; the completed mirror 370C-1 of primary 170A-1, which has file group directory file 364C-1, database control file 372C-1, database redo file 376C-1, and database data file 374C-1; and the completed mirror of 380B-2, which has database control file 382B-2, database data file 384B-2 and database redo file 386B-2.

If another disk is added to this architecture 340, rebalancing would restart again, and eventually look like the original state 100 the cluster system architecture.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
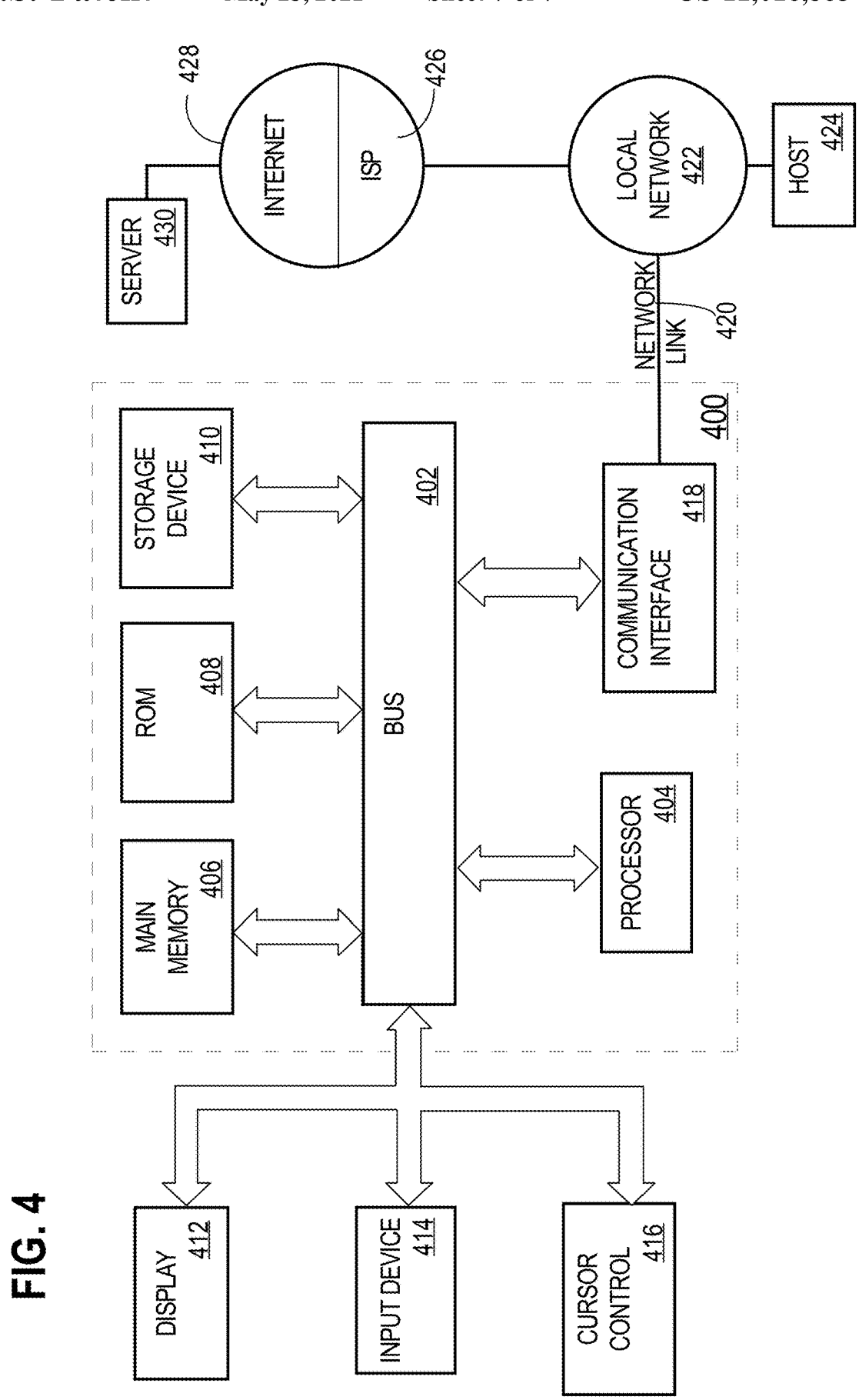
FIG. 4 is a block diagram illustrating a computer system that may be used to implement the techniques described herein.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
associating a plurality of block addressable storage units as a part of a disk group configured to store files for a plurality of databases, wherein the plurality of databases comprises a first database and a second database different from the first database, wherein the files for each database of the plurality of databases comprise a table and an index of the database;
storing a first file group and a second file group in the disk group, wherein files in the first file group only store data for the first database and files in the second file group only store data for the second database;
for each file group of the first file group and the second file group, storing, with said file group, storage management property values describing how to apply certain storage management operations to said file group on a file basis, wherein storage management property values for the first file group are distinct from storage management property values for the second file group;
a database server receiving a data definition language (DDL) statement specifying a first value for a first storage management property of said first file group; and
in response receiving said DDL statement, said database server setting said first storage management property to said first value,
wherein the method is performed by one or more computing devices.

2. The method of claim 1, wherein the storage management property values include a particular storage management property value, wherein storing storage management property values for each file group includes:
storing a first value for the particular storage management property value for the first file group;
storing a second value for the particular storage management property value for the second file group;
wherein the first value is different than the second value.

3. The method of claim 2, wherein the particular storage management property value is redundancy, the method further comprising:
automatically, maintaining, on the block addressable storage units of the disk group, a first number of copies of a first database of the plurality of databases according to a first redundancy property representing the particular storage management property value for the first file group that has files for the first database;
automatically, maintaining, on the block addressable storage units of the disk group, a second number of copies of a second database of the plurality of databases according to a second redundancy property representing the particular storage management property value for the second file group that has files for the second database;
wherein the first number of copies and the second number of copies are different.

4. The method of claim 2, further comprising:
striping each file of the first file group across a first subset of the plurality of block addressable storage units of the disk group;
striping each file of the second file group across a second subset of the plurality of block addressable storage units of the disk group;
wherein the first subset and the second subset intersect with respect to at least one block addressable storage unit causing a first set of stripes from the files of the first file group on the at least one block addressable storage unit to have different storage management properties than a second set of stripes from the files of the second file group.

5. The method of claim 1, further comprising:
detecting a failure in at least one block addressable storage unit of the plurality of the block addressable storage units of the disk group;
automatically, restoring a first set of lost data from files in a particular file group according to a particular property of the particular file group.

6. The method of claim 5, wherein the particular property of the particular file group is priority, the method further comprising:
based on the particular property, restoring the first set of lost data from the files in the particular file group prior to restoring a second set of lost data from files in another particular file group.

7. The method of claim 6, further comprising:
based on a copy of the first set of lost data, determining a file-type of each stripe in the first set of lost data;
restoring a first set of stripes of a first particular file-type prior to restoring a second set of stripes of a second particular file-type.

8. One or more non-transitory computer-readable media storing one or more sequences of instructions which, when executed by one or more processors, cause performing of:
associating a plurality of block addressable storage units as a part of a disk group configured to store files for a plurality of databases, wherein the plurality of databases comprises a first database and a second database different from the first database, wherein the files for each database of the plurality of databases comprise a table and an index of the database;
storing a first file group and a second file group in the disk group, wherein files in the first file group only store data for the first database and files in the second file group only store data for the second database;
for each file group of the first file group and the second file group, storing, with said file group, storage management property values describing how to apply certain storage management operations to said file group on a file basis;
a database server receiving a data definition language (DDL) statement specifying a first value for a first storage management property of said first file group; and
in response receiving said DDL statement, said database server setting said first storage management property to said first value,
wherein storage management property values for the first file group are distinct from storage management property values for the second file group.

9. The one or more non-transitory computer-readable media of claim 8, wherein the storage management property values include a particular storage management property value; wherein storing storage management property values for each file group includes:

storing a first value for the particular storage management property value for the first file group;
storing a second value for the particular storage management property value for the second file group;
wherein the first value is different than the second value.

10. The one or more non-transitory computer-readable media of claim 9, wherein the particular storage management property value is redundancy; wherein the one or more non-transitory computer-readable media store instructions which, when executed by the one or more processors, further cause:
automatically, maintaining, on the block addressable storage units of the disk group, a first number of copies of a first database of the plurality of databases according to a first redundancy property representing the particular storage management property value for the first file group that has files for the first database;
automatically, maintaining, on the block addressable storage units of the disk group, a second number of copies of a second database of the plurality of databases according to a second redundancy property representing the particular storage management property value for the second file group that has files for the second database;
wherein the first number of copies and the second number of copies are different.

11. The one or more non-transitory computer-readable media of claim 9, wherein the one or more non-transitory computer-readable media store instructions which, when executed by the one or more processors, further cause:
striping each file of the first file group across a first subset of the plurality of block addressable storage units of the disk group;
striping each file of the second file group across a second subset of the plurality of block addressable storage units of the disk group;
wherein the first subset and the second subset intersect with respect to at least one block addressable storage unit causing a first set of stripes from the files of the first file group on the at least one block addressable storage unit to have different storage management properties than a second set of stripes from the files of the second file group.

12. The one or more non-transitory computer-readable media of claim 8, wherein the one or more non-transitory computer-readable media store instructions which, when executed by the one or more processors, further cause:
detecting a failure in at least one block addressable storage unit of the plurality of the block addressable storage units of the disk group;
automatically, restoring a first set of lost data from files in a particular file group according to a particular property of the particular file group.

13. The one or more non-transitory computer-readable media of claim 12, wherein the particular property of the particular file group is priority; wherein the one or more non-transitory computer-readable media store instructions which, when executed by the one or more processors, further cause:
based on the particular property, restoring the first set of lost data from the files in the particular file group prior to restoring a second set of lost data from files in another particular file group.

14. The one or more non-transitory computer-readable media of claim 13, wherein the one or more non-transitory computer-readable media store instructions which, when executed by the one or more processors, further cause:
based on a copy of the first set of lost data, determining a file-type of each stripe in the first set of lost data;
restoring a first set of stripes of a first particular file-type prior to restoring a second set of stripes of a second particular file-type.

15. A storage management system comprising:
one or more processors and one or more memories communicatively coupled to the one or more processors, said processors configured to:
associate a plurality of block addressable storage units as a part of a disk group configured to store files for a plurality of databases, wherein the plurality of databases comprises a first database and a second database different from the first database, wherein the files for each database of the plurality of databases comprise a table and an index of the database;
store a first file group and a second file group in the disk group, wherein files in the first file group only store data for the first database and files in the second file group only store data for the second database;
for each file group of the first file group and the second file group, store, with said file group, storage management property values describing how to apply certain storage management operations to in said file group on a file basis;
receive a data definition language (DDL) statement specifying a first value for a first storage management property of said first file group; and
in response receiving said DDL statement, set said first storage management property to said first value,
wherein storage management property values for the first file group are distinct from storage management property values for the second file group.

16. The storage management system of claim 15, wherein the storage management property values include a particular storage management property value; wherein said processors are further configured to:
store a first value for the particular storage management property value for the first file group;
store a second value for the particular storage management property value for the second file group;
wherein the first value is different than the second value.

17. The storage management system of claim 16, wherein the particular storage management property value is redundancy; wherein said processors are further configured to:
automatically, maintain, on the block addressable storage units of the disk group, a first number of copies of a first database of the plurality of databases according to a first redundancy property representing the particular storage management property value for the first file group that has files for the first database;
automatically, maintain, on the block addressable storage units of the disk group, a second number of copies of a second database of the plurality of databases according to a second redundancy property representing the particular storage management property value for the second file group that has files for the second database;
wherein the first number of copies and the second number of copies are different.

18. The storage management system of claim 16, wherein said processors are further configured to:
stripe each file of the first file group across a first subset of the plurality of block addressable storage units of the disk group;
stripe each file of the second file group across a second subset of the plurality of block addressable storage units of the disk group;

wherein the first subset and the second subset intersect with respect to at least one block addressable storage unit causing a first set of stripes from the files of the first file group on the at least one block addressable storage unit to have different storage management properties than a second set of stripes from the files of the second file group.

19. The storage management system of claim 15, wherein said processors are further configured to:
   detect a failure in at least one block addressable storage unit of the plurality of the block addressable storage units of the disk group;
   automatically, restore a first set of lost data from files in a particular file group according to a particular property of the particular file group.

20. The storage management system of claim 19, wherein the particular property of the particular file group is priority; wherein said processors are further configured to:
   based on the particular property, restore the first set of lost data from the files in the particular file group prior to restoring a second set of lost data from files in another particular file group.

21. The storage management system of claim 20, wherein said processors are further configured to:
   based on a copy of the first set of lost data, determine a file-type of each stripe in the first set of lost data;
   restore a first set of stripes of a first particular file-type prior to restoring a second set of stripes of a second particular file-type.

* * * * *